3,108,928
TREATMENT AND USE OF ENZYMES FOR THE HYDROLYSIS OF STARCH
Henry R. Kathrein, Muscatine, Iowa, assignor to Grain Processing Corporation, Muscatine, Iowa, a corporation of Iowa
No Drawing. Filed July 30, 1962, Ser. No. 213,121
17 Claims. (Cl. 195—31)

This invention relates to the treatment of starch hydrolyzing enzyme preparations and to an improved enzymatic process for the production of hydrolyzates of starch and starch products having exceptionally high dextrose content.

Although the presence of starch hydrolyzing enzymes is widespread within the plant and animal kingdom, sources of microbiological origin are used most commonly in industry in the enzymatic saccharification of liquefied starch to form dextrose-containing syrups. The culture filtrates of *Aspergillus phoenicis*, *Aspergillus diastaticus*, *Aspergillus usamii* and *Aspergillus niger* produce excellent enzyme systems which hydrolyze liquefied starch to dextrose. Cultures of *Aspergillus niger* are particularly advantageous.

The broth resulting from the fermentation of these organisms generally contains several enzymes having different activities, some of which interefere with the production of dextrose when the enzyme preparation is employed to hydrolyze starch. Thus, for example, in the culture broth of *Aspergillus niger* three predominant enzyme systems have been identified, namely, alpha-amylase, glucamylase (amyloglucosidase) and transglucosidase. Alpha-amylase attacks the whole starch granule and breaks it down into a dispersed colloidal mass. This dispersion contains a linear fraction from amylose of polymerized dextrose attached in the alpha-1,4-positions and a branched polymer from amylopectin which also contains alpha-1,4-linkages but in addition has branched positions adjoining with alpha-1,6-linkages. After liquefaction, additional contact of alpha-amylase with these fractions reduces the molecular size appreciably and causes a desirable reduction in viscosity.

In contrast to the multi-chain action of alpha-amylase, the action of glucamylase is thought to be a "single-chain" action where an enzyme molecule attaches to the dextrin before detaching and attacking another dextrin. The action of glucamylase on dextrin polymers is much more specific at the alpha-1,4-glucosidic bonds than at the alpha-1,6-glucosidic bonds in that it will cleave the former type bond approximately 30 times as fast as the latter type bond. The glucamylase action thus results in the formation of dextrose.

The presence of transglucosidase with glucamylase in enzyme preparations detracts from the potential yield of dextrose in the hydrolyzate. Transglucosidase is known to catalyze transglucosylation reactions between dextrose, maltose and other intermediate saccharified products. As a result, upon completion of the saccharification reaction saccharides other than dextrose are still present in substantial amounts.

Accordingly it is highly desirable to separate the desired glucamylase enzyme from other enzymes, principally transglucosidase, present in fungal enzyme preparations which, in the hydrolysis of starch, interfere with the formation of dextrose.

The present invention provides a process for purifying glucamylase containing fungal enzyme preparations to separate therefrom enzymes which, in the hydrolyzation of starchy materials, interefere with the production of dextrose. The present invention also provides a process for hydrolyzing starch to obtain high yields of dextrose by subjecting a liquefied starchy material to the action of a purified glucamylase-containing fungal enzyme preparation from which there has been removed those enzymes which interfere with the production of dextrose.

In accordance with the present invention a glucamylase-containing fungal enzyme preparation is purified by adjusting the hydrogen ion concentration of an aqueous solution thereof to a pH within the range from about 9.0 to 11.0 and maintaining the solution at a temperature sufficient to effectively inactivate the transglucosidase. If necessary, after treatment at the alkaline pH the aqueous fungal enzyme preparation can be filtered or centrifuged to remove undissolved solids therefrom with the desired glucamylase remaining in the filtrate. Adjustment of the pH to a minimum level is a critical feature of the invention and it is essential that a pH in excess of about 9.0 be employed in order to achieve the desired inactivation and removal of transglucosidase activity. The maximum pH value which can be employed in the treatment is also important since recovery of glucamylase is adversely affected when the terminating pH is too high, i.e. above about 11. It is generally preferred to adjust the pH of the solution to a value in the range from about 9.5 to 10.

A principal object of the process of the present invention is to effectively remove transglucosidase from the culture broth with minimum loss in glucamylase activity. The conditions employed in the treatment are important in this connection and should therefore be maintained within prescribed limits for optimum results. In general, the process is carried out at a temperature within the range from about 20 to 55° C., preferably 30 to 35° C., for a period of time varying from about 15 minutes up to 24 hours or more. It is generally preferred to raise the pH of the solution gradually to the requisite level of alkalinity, since this manipulative technique tends to maximize recovery of the desired glucamylase enzyme. The pH of the enzyme solution can be adjusted rapidly to a pH of about 8 and then gradually to a final level of 9.5 to 10 over a period of about 30 to 40 minutes with good results.

Any suitable alkaline material capable of raising the pH of the desired level can be employed to treat the glucamylase containing enzyme preparation in accordance with the invention. Such materials include the hydroxides and carbonates of the alkali metals sodium, potassium and lithium; ammonium hydroxide and the like.

According to one particularly preferred embodiment of the invention magnesium oxide is employed to treat the glucamylase containing fungal enzyme preparation. It has been found unexpectedly that magnesium oxide exerts a salutary and unique effect on the purification of glucamylase enzyme preparations as will be more fully shown hereinafter. Magnesium oxide can be used alone to adjust the pH of the enzyme solution to the desired alkaline level or it can be used in conjunction with other alkaline agents suitable for this purpose in which case improved recovery of glucamylase enzymes is generally achieved, this being attributable to the presence of magnesium oxide. In any event, the magnesium oxide is employed for treating the enzyme preparations in amounts ranging from about 1 to about 10 and preferably from 1.5 to 2 percent by weight. When magnesium oxide is employed alone to adjust the pH of the enzyme preparation, it is preferable that the initial pH of the enzyme preparation at the start of the purification treatment be in the range of 2.5 to 6.5 and preferably 3.0. Higher initial pH levels result in reduced recovery of the glucamylase.

The process of the invention is applicable and specific to purification of glucamylase-containing fungal enzyme preparations to remove therefrom transglucosidase. Accordingly, glucamylase-containing culture filtrates of *Aspergillus phoenicis*, *Aspergillus diastaticus*, *Aspergillus*

*usamii* and *Aspergillus niger* can be advantageously treated by the process of the invention.

One specific, preferred embodiment of the process of the invention is carried out as follows: A glucamylase-containing fungal enzyme culture filtrate, either with mycelium present or preferably after being filtered to remove the mycelium, is adjusted to a pH of about 3.0. The temperature of the enzyme liquor is equilibrated to about 30° C. and 2 percent magnesium oxide is added and the mixture agitated approximately 40 minutes. Immediately after magnesium oxide addition the pH of the enzyme liquor rises to approximately 7.8 and then continues to rise more gradually so that at the end of the agitation period a final pH level of 9.3–9.9 is achieved. After the 40 minute agitation period, the solution is filtered to remove magnesium oxide and the pH of the filtrate is then readjusted to approximately 5. The treated glucamylase enzyme preparation substantially devoid of transglucosidase activity can be used for starch conversion in this form, or it can be concentrated, or it can be precipitated by means of alcohol to obtain the glucamylase enzyme in dry form.

Several procedures can be employed to evaluate the effectiveness of the purification treatment. The ultimate test is, of course, the ability of the treated enzyme preparation to hydrolyze starch to produce hydrolyzates having high dextrose contents, such as dextrose equivalents of 94 to 98 and above.

One convenient evaluation procedure which can be made quickly is to determine the ratio of maltase to glucamylase activity in the treated enzyme preparation. This ratio gives a reliable semi-quantitative indication of the presence or absence of transglucosidase, since transglucosidase can hydrolyze maltose producing two glucose, one glucose plus one isomaltose or one glucose plus one panose molecule for every maltose molecule hydrolyzed. Obviously in the last case a second maltose molecule is involved as an acceptor for the second glucose molecule produced in the hydrolysis. Thus, a reduction in maltase activity with no reduction in glucamylase activity is an indication of transglucosidase removal. Filtered fermentation liquors in which transglucosidase is not removed have maltase:glucamylase (Malt.:GA) ratios generally between 60:1 and 65:1. By removing transglucosidase from the fermentation liquors this ratio will drop to as low as 32:1. The maltase activity is determined by the method of Tsuchiya, Corman and Koepsell (Cereal Chem. 27: 322–330, 1950). The glucamylase determination is made as follows: The substrate is a 15–18 D.E. acid hydrolyzate of corn starch dissolved in water and diluted to 4.0 grams of dry substance per 100 ml. of solution. Exactly 50 ml. of the hydrolyzate solution is pipetted into a 100 ml. volumetric flask. To the flask is added 5.0 ml. of 1.0 molar sodium acetate-acetic acid buffer to provide a pH 4.3. The flask is placed in a water bath at 60° C., and after 10 minutes the proper amount of enzyme preparation is added. At exactly 120 minutes after addition of the enzyme preparation, the solution is adjusted to a phenolphthalein end-point with one normal sodium hydroxide, cooled to room temperature, and diluted to volume. A reducing value, calculated as dextrose, is determined on the diluted sample and on a control with no enzyme preparation added. Glucamylase activity is calculated as follows:

$$A = \frac{S-B}{2 \times E}$$

where $A$ = glucamylase activity, units per ml.
$S$ = reducing sugars in enzyme converted sample, grams per 100 ml.
$B$ = reducing sugars in control, grams per 100 ml.
$E$ = amount of enzyme prep. used, ml. or grams.

The reducing sugar concentration in the enzyme-converted sample should not be more than 1.0 gram per 100 ml.

The effect upon transglucosidase removal and glucamylase recovery by adjusting the pH of glucamylase-containing fungal enzyme liquors is seen from data in the table below. The enzyme preparations were treated at room temperature with constant agitation. In certain samples the pH was adjusted rapidly (in a matter of minutes) to pH 10 with strong bases and the samples were held at this pH for 30 minutes nad then adjusted to pH 6. In other samples the pH was adjusted gradually, either with a strong base or magnesium oxide, to a final pH of 10. When magnesium oxide is employed alone in the amount of 2.0 percent (weight/volume) the pH rises rapidly to about 7.85 in the first minute and at the end of 30 minutes reaches pH 10.0. The results given, including starch hydrolysis results, are for two different experiments.

TABLE I

| Treatment of fungal enzyme | Maltase units/ml. | Glucamylase units/ml. | Ratio maltase/glucamylase | Percent recovery of glucamylase | Dextrose equivalent at 67–70 hrs. |
|---|---|---|---|---|---|
| Control—no treatment | 255.1 | 4.12 | 62:1 | | 94.8 |
| Adjustment of pH to 9.9 with magnesium oxide 2% weight/vol. | 117.9 | 3.49 | 34:1 | 84.6 | 97.1 |
| Gradual pH adjustment to 10.0 with sodium hydroxide | 109.6 | 2.53 | 43:1 | 61.4 | 97.0 |
| Rapid pH adjust to 10.0 and hold 30 min. | 78.1 | 2.13 | 37:1 | 51.8 | |
| Control—no treatment | 195.0 | 3.04 | 64:1 | | 92.2 |
| Adjustment of pH to 9.9 with magnesium oxide 2% weight/vol. | 88.1 | 2.18 | 40:1 | 71.8 | 95.3 |
| Gradual pH adjustment to 10.0 with sodium hydroxide | 71.4 | 1.95 | 37:1 | 64.4 | 96.7 |
| Gradual pH adjustment to 10.0 with ammonium hydroxide | 72.7 | 1.86 | 39:1 | 67.4 | |

As seen from the above, the ratio of maltase to glucamylase is greatly reduced by treatment in accordance with the invention, indicating removal of transglucosidase. It will be noted also that the samples treated in accordance with the invention when utilized in the hydrolysis of starch produced products having desirably high dextrose contents.

Additional experiments were carried out wherein glucamylase-containing fungal enzyme preparations were treated at 30° C. for a period of 40 minutes with agitation. As will be seen from the results in Table II, treatment with magnesium oxide (I and II being magnesium oxide obtained from different sources) is preferred to the pH adjustment by other bases in that the magnesium oxide enhances glucamylase recovery.

TABLE II

| Treatment | Terminating pH | Maltase units/ml. | Glucamylase units/ml. | Ratio malt.:GA | Percent recovery GA |
|---|---|---|---|---|---|
| No treatment | | 171.5 | 2.808 | 61:1 | |
| 2.0% magnesium oxide (I) | 9.75 | 108.5 | 2.471 | 44:1 | 88.1 |
| Gradual pH adjustment to 10.0 | 10.0 | 80.6 | 1.838 | 44:1 | 65.5 |
| Rapid pH adjustment to 10.0 and hold 40 minutes | 10.0 | 69.4 | 1.663 | 42:1 | 59.2 |
| 2.0% magnesium oxide (II) | 9.15 | 130.2 | 2.652 | 49:1 | 94.4 |
| 2.0% magnesium oxide (II) adjust pH to 10.0 | 10.0 | 94.9 | 2.354 | 40:1 | 83.8 |

The results presented in the following table show the effectiveness of magnesium oxide for the removal of transglucosidase from several different glucamylase-containing fungal enzyme cultures.

TABLE III

| Culture | Terminating pH | Maltase units/ml. | Glucamylase units/ml. | Ratio malt.: GA | Percent recovery GA |
|---|---|---|---|---|---|
| Aspergillus niger NRRL 330, no treat | | 152.0 | 1.97 | 77:1 | |
| Aspergillus niger NRRL 330, 2.0% MgO | 9.8 | 68.0 | 1.68 | 40:1 | 85.5 |
| A. phoenicis ATCC 13157, no treat | | 160.5 | 2.17 | 74:1 | |
| A. phoenicis ATCC 13157, 2.0% MgO | 9.6 | 65.3 | 1.68 | 39:1 | 77.5 |
| A. niger ATCC 13497, no treat | | 69.4 | 1.57 | 44:1 | |
| A. niger ATCC 13497, 2.0% MgO | 9.8 | 52.0 | 1.48 | 35:1 | 94.4 |
| A. niger NRRL 326, no treat | | 159.1 | 2.416 | 66:1 | |
| A. niger NRRL 326, 2.0% MgO | 9.7 | 79.2 | 1.846 | 43:1 | 76.4 |
| A. niger NRRL 337, no treat | | 52.4 | .83 | 63:1 | |
| A. niger NRRL 337, 2.0% MgO | 9.7 | 34.0 | .72 | 47:1 | 87.8 |

The effect of the initial pH of the enzyme solution upon purification and particularly the glucamylase recovery when employing magnesium oxide alone to adjust pH is shown below. As will be noted, the higher the initial pH of the enzyme solution, the less satisfactory is the recovery of glucamylase.

TABLE IV

| Treatment, initial pH | Terminating pH | Maltase units/ml. | Glucamylase units/ml. | Ratio malt.: GA | Percent recovery GA |
|---|---|---|---|---|---|
| Control, no treatment | | 178.4 | 2.867 | 62:1 | |
| Initial pH 3.0 | 9.4 | 105.2 | 2.486 | 42:1 | 86.7 |
| Initial pH 4.5 | 10.3 | 94.2 | 2.215 | 43:1 | 77.3 |
| Initial pH 5.0 | 10.4 | 93.5 | 2.150 | 43:1 | 75.0 |
| Initial pH 5.5 | 10.6 | 83.0 | 2.145 | 39:1 | 74.8 |
| Initial pH 6.0 | 10.7 | 75.1 | 1.955 | 38:1 | 68.2 |
| Initial pH 6.5 | 10.9 | 60.9 | 1.614 | 38:1 | 56.2 |
| Initial pH 7.0 | 11.0 | 37.4 | .986 | 38:1 | 34.4 |
| Initial pH 7.5 | 11.2 | 15.3 | .282 | 54:1 | 9.8 |

Results obtained by treating fungal enzyme preparations with various levels of magnesium oxide are tabulated below. The magnesium oxide was added to the freshly filtered fungal enzyme culture liquor and the slurry agitated on a reciprocating shaker at 28° C. for 30 minutes. After the agitation period the samples were filtered and the maltase and glucamylase activity determined as previously indicated. It will be noted that when the magnesium oxide was employed in amounts insufficient to raise the pH to above the critical value of pH 9.0, no improvement in the maltase-glucamylase ratio was obtained.

TABLE V

| Level magnesium oxide used | Terminating pH | Maltase units/ml. | Glucamylase units/ml. | Ratio malt.: GA | Percent recovery GA |
|---|---|---|---|---|---|
| Control, no treatment | | 184.7 | 3.08 | 60:1 | |
| 0.5% magnesium oxide | 7.2 | 200.0 | 3.10 | 65:1 | 100.5 |
| 1.0% magnesium oxide | 8.5 | 194.7 | 3.02 | 64:1 | 98.1 |
| 2.0% magnesium oxide | 10.4 | 98.8 | 2.65 | 37:1 | 86.0 |
| 4.0% magnesium oxide | 10.7 | 108.7 | 2.60 | 41:1 | 84.4 |

The effect upon transglucosidase removal of the temperature at which the treatment is conducted is shown below. Aliquots of the enzyme were stirred with 2.0 percent magnesium oxide while controlling the temperature with a cooled or heated water bath. Agitation was accomplished by means of mechanical stirring and after 30 minutes stirring the samples were centrifuged to remove magnesium oxide and the supernatant fraction readjusted to pH 6. In other similar experiments wherein temperatures of 65 and 70° were employed, the recovery of glucamylase dropped to as low as 5 percent.

TABLE VI

| Temperature used for MgO treatment | Maltase units/ml. | Glucamylase units/ml. | Ratio malt.: GA | Percent recovery of GA | Dextrose equivalent at 70 hrs. |
|---|---|---|---|---|---|
| Control, no treatment | 198.9 | 3.05 | 65:1 | | 92.5 |
| 15° C | 178.7 | 2.97 | 60:1 | 97.4 | |
| 23° C | 148.1 | 2.84 | 52:1 | 92.9 | |
| 30° C | 132.0 | 2.69 | 49:1 | 88.1 | 94.8 |
| 40° C | 125.5 | 2.70 | 46:1 | 88.3 | 94.8 |
| 50° C | 103.5 | 2.40 | 43:1 | 79.4 | 93.4 |

When varying the time of treatment over a wide range, the data presented in Table VII was obtained. It will be noted also that the glucamylase-containing enzymes can be exposed to treatment with magnesium oxide for periods up to 24 hours or more without glucamylase destruction. In these experiments magnesium oxide in a proportion of 2.0 percent was added to the enzyme with agitation. The temperature was maintained at 35° C. for the initial 40 minute treatment period and then the samples were permitted to equilibrate to room temperature while agitation was continued.

TABLE VII

| Period of treatment | Term. pH | Maltase units/ml. | Glucamylase units/ml. | Ratio malt.: GA | Percent recovery of GA |
|---|---|---|---|---|---|
| GLASS CONTAINER | | | | | |
| Untreated control | | 169.0 | 2.83 | 60:1 | |
| Agitation for 40 min | 9.9 | 104.1 | 2.62 | 40:1 | 92.6 |
| Agitation for 1 hr., 40 min | | 102.1 | 2.63 | 39:1 | 92.9 |
| Agitation for 2 hr., 40 min | | 107.5 | 2.65 | 40:1 | 93.7 |
| Agitation for 4 hr., 40 min | | 103.1 | 2.69 | 38:1 | 94.9 |
| Agitation for 7 hr., 40 min | | 99.0 | 2.71 | 37:1 | 95.4 |
| Agitation for 22 hr., 40 min | 10.9 | 101.4 | 2.75 | 37:1 | 97.1 |
| STAINLESS STEEL CONTAINER | | | | | |
| Untreated control | | 180.5 | 3.09 | 58:1 | |
| Agitation for 40 min | 9.9 | 96.3 | 2.75 | 35:1 | 89.0 |
| Agitation for 1 hr., 40 min | 10.0 | 110.9 | 2.62 | 42:1 | 84.8 |
| Agitation for 2 hr., 40 min | 10.0 | | 2.72 | | 88.0 |
| Agitation for 4 hr., 40 min | 10.3 | | 2.75 | | 89.0 |
| Agitation for 8 hr., 40 min | 10.2 | 105.5 | 2.87 | 37:1 | 92.7 |
| Agitation for 24 hr., 40 min | 10.5 | 106.5 | 2.86 | 37:1 | 92.5 |
| BLACK IRON CONTAINER | | | | | |
| Agitation for 40 min | 9.8 | 105.8 | 2.54 | 42:1 | 82.2 |
| Agitation for 1 hr., 40 min | 9.9 | 104.8 | 2.58 | 41:1 | 83.6 |
| Agitation for 2 hr., 40 min | 10.0 | | 2.64 | | 85.3 |
| Agitation for 4 hr., 40 min | 10.2 | | 2.62 | | 84.6 |
| Agitation for 8 hr., 40 min | 10.2 | | 2.65 | | 85.5 |
| Agitation for 24 hr., 40 min | 10.4 | 107.1 | 2.69 | 40:1 | 86.9 |

*Example*

Dried fungal enzyme preparations of Aspergillus niger purified in accordance with the invention were employed in the hydrolysis of an enzyme-partially-liquefied starch. The purification treatment was conducted as follows: 111 gallons fungal enzyme material were filtered through a plate and frame filter. The pH of the filtrate was adjusted to 3.0 and 2.0 percent magnesium oxide was added to the enzyme after the temperature had equilibrated to 30° C. The slurry was agitated by means of a mechanical agitator for 40 minutes at this temperature. After the treatment period the material was again filtered through a plate and frame filter and the pH readjusted to 4.75. The enzyme material was then concentrated and precipitated. After drying, maltase and glucamylase analyses were made and the dried enzyme used for starch saccharification.

The enzyme liquefied starch substrate is prepared by dispersing line starch in water in proportions to obtain 27 percent solids concentration. The pH is adjusted to 7.0–7.2 and the slurry heated gradually. When a temperature of 49° C. is reached bacterial alpha-amylase is added to the starch slurry and the temperature raised to 75–79° C. where it is held for one hour. The temperature of the starch slurry is then raised to 95–99° C. and held for 15 minutes. The starch is then cooled to 75–77° C. and additional bacterial alpha-amylase in water added. A total of 6356 SKB units of alpha-amylase per pound of starch is employed for the liquefaction. After 30 minutes at this temperature the liquefied starch, approximately 27 percent solids, is cooled to 60° C. and the pH adjusted to 4.3.

Two tanks containing 300–306 gallons of starch (27% solids) were liquefied with bacterial enzyme and the conversion carried out with a dried fungal enzyme preparation that had been treated with 2.0 percent magnesium oxide. The fungal enzyme was used at the rate of 15 glucamylase units per 100 grams starch. The conversion was run for 64 hours at 60° C., pH 4.0–4.2. The resulting material was processed to crystalline dextrose. The results of these runs are shown below.

TABLE VIII

| Tank | Maltase units/ml | Enzyme used, glucamylase units/ml. | Ratio malt.: GA | Dextrose equivalent at 66 hrs. |
| --- | --- | --- | --- | --- |
| No. 1 (300 gal. starch 27.0% solids) | 2,835 | 67.4 | 42:1 | 98.0 |
| No. 2 (300 gal. starch 27.0% solids) | 2,835 | 67.4 | 42:1 | 98.7 |

The foregoing data clearly illustrates the advantages of the invention as well as the relative importance of the various operating variables involved in the novel process.

Those modifications and equivalents which fall within the spirit of the invention and the scope of the appended claims are to be considered part of the invention.

I claim:

1. A process of treating a transglucosidase and glucamylase-containing fungal enzyme preparation which comprises adjusting the pH of said preparation in aqueous medium to a level from about 9.0 to about 11.0 and maintaining said preparation at a temperature between about 20 and 55° C. for a period in excess of about 15 minutes to substantially inactivate transglucosidase enzyme.

2. The process of claim 1 wherein the pH is adjusted to within the range from about 9.5 to 10.

3. The process of claim 1 wherein treatment at the alkaline pH is carried out for a period of time ranging from about 15 minutes up to 24 hours.

4. The process of claim 1 wherein treatment is carried out at a temperature of 30–35° C.

5. The process of claim 1 wherein the transglucosidase and glucamylase-containing fungal enzyme preparation is derived from the Aspergillus genus.

6. The process of claim 1 wherein the transglucosidase and glucamylase-containing fungal enzyme preparation is derived from *Aspergillus niger*.

7. The process of treating a transglucosidase and glucamylase-containing fungal enzyme preparation which comprises contacting said preparation in aqueous medium with magnesium oxide at a temperature between about 20 and 55° C. for a time in excess of about 15 minutes to substantially inactivate transglucosidase enzyme, the said magnesium oxide being employed in an amount to provide a pH in said aqueous medium of from about 9.0 to about 11.0 and then separating the purified glucamylase enzyme from undissolved magnesium oxide.

8. The process of claim 7 wherein the magnesium oxide is employed in an amount from about 1 to about 10 percent by weight.

9. The process of claim 7 wherein the magnesium oxide is employed in an amount from about 1.5 to 2.0 percent by weight.

10. The process of claim 7 wherein treatment at the alkaline pH is carried out for a period of time ranging from about 15 minutes up to 24 hours.

11. The process of claim 7 wherein treatment is carried out at a temperature of 30–35° C.

12. The process of treating a transglucosidase and glucamylase-containing fungal enzyme preparation which comprises adding a strong alkali and magnesium oxide to an aqueous medium of said enzyme preparation to adjust the pH thereof to a level from about 9.0 to 11.0 maintaining said preparation at a temperature between 20 and 55° C. for a time in excess of about 15 minutes to substantially inactivate transglucosidase enzyme.

13. A process of treating a transglucosidase and glucamylase-containing fungal enzyme preparation which comprises adjusting the pH of said preparation in aqueous medium to a level of 2.5 to 6.5, adjusting the temperature of said preparation to within the range from 20 to 55° C., and then adjusting the pH of said preparation in aqueous medium to a level from about 9.0 to 11.0, maintaining the preparation at the elevated pH for a period ranging from 15 minutes to about 24 hours.

14. A process of treating a transglucosidase and glucamylase-containing fungal enzyme preparation which comprises adjusting the pH of said preparation in aqueous medium to a level of about 3.0, adjusting the temperature of said preparation to about 30° C., and then contacting said preparation in aqueous medium with magnesium oxide for a time in excess of about 15 minutes to substantially inactivate transglucosidase enzyme, the said magnesium oxide being employed in an amount to provide a pH in said aqueous medium of from about 9.0 to about 11.0 and then separating the purified glucamylase enzyme from undissolved magnesium oxide.

15. In a process for producing dextrose from starchy materials wherein the starchy material is hydrolyzed with fungal enzymes, the improvement which consists in hydrolyzing the starchy material with a glucamylase-containing fungal enzyme preparation which has been purified by adjusting the pH of said preparation in aqueous medium to from about 9.0 to about 11.0 and maintaining said preparation at a temperature in the range from about 20 to 55° C. for a time in excess of about 15 minutes to substantially inactivate transglucosidase enzyme.

16. In a process for producing dextrose from starchy materials wherein the starchy material is hydrolyzed with fungal enzymes, the improvement which consists in hydrolyzing the starchy material with a glucamylase-containing fungal enzyme preparation which has been purified by contacting said enzyme preparation in aqueous medium with magnesium oxide at a temperature between about 20 and 55° C. for a time in excess of about 15 minutes to substantially inactivate transglucosidase enzyme, the said magnesium oxide being employed in an amount to provide a pH in said aqueous medium of from about 9.0 to 11.0 and then separating the purified glucamylase enzyme from undissolved magnesium oxide.

17. In a process for producing dextrose from starchy materials wherein the starchy material is hydrolyzed with fungal enzymes, the improvement which consists in hydrolyzing the starchy material with a glucamylase-containing fungal enzyme preparation which has been purified by adjusting the pH of said preparation in aqueous medium to a level of about 9.5 to 10, maintaining said preparation at a temperature in the range from about 20 to 55° C. for a time ranging from about 15 minutes up to 24 hours.

No references cited.